US007305954B2

(12) United States Patent
Hagiwara et al.

(10) Patent No.: US 7,305,954 B2
(45) Date of Patent: Dec. 11, 2007

(54) PLASMA-JET SPARK PLUG AND IGNITION SYSTEM

(75) Inventors: Katsunori Hagiwara, Mie (JP); Satoshi Nagasawa, Nagoya (JP); Wataru Matutani, Nagoya (JP); Toru Nakamura, Nagoya (JP); Tomoaki Kato, Nagoya (JP); Yuichi Yamada, Aichi (JP)

(73) Assignee: NGK Spark Plug Co., Ltd., Aichi (JP)

(*) Notice: Subject to any disclaimer, the term of this patent is extended or adjusted under 35 U.S.C. 154(b) by 0 days.

(21) Appl. No.: 11/723,625

(22) Filed: Mar. 21, 2007

(65) Prior Publication Data

US 2007/0221156 A1 Sep. 27, 2007

(30) Foreign Application Priority Data

Mar. 22, 2006 (JP) ............................ 2006-078710
Mar. 2, 2007 (JP) ............................ 2007-052148

(51) Int. Cl.
*F02P 23/04* (2006.01)
*G01P 3/66* (2006.01)

(52) U.S. Cl. ................................ 123/143 B; 73/35.15

(58) Field of Classification Search ............ 123/143 B, 123/143 C, 145 A, 169 C, 169 R, 145 R, 123/169 EL; 313/141, 118, 142, 122, 130; 219/270, 267, 533, 544; 361/260, 264; 73/35.11, 73/35.15

See application file for complete search history.

(56) References Cited

U.S. PATENT DOCUMENTS

| | | | | |
|---|---|---|---|---|
| 6,611,084 | B2 * | 8/2003 | Teramura et al. | 313/141 |
| 6,973,820 | B2 * | 12/2005 | Watarai et al. | 73/35.13 |
| 7,234,429 | B2 * | 6/2007 | Abe et al. | 123/169 R |
| 2007/0114901 | A1 * | 5/2007 | Nagasawa et al. | 313/141 |

FOREIGN PATENT DOCUMENTS

| | | |
|---|---|---|
| JP | 57-15377 | 1/1982 |
| JP | 2-72577 | 3/1990 |
| JP | 2006-294257 A | 10/2006 |

* cited by examiner

*Primary Examiner*—Willis R. Wolfe
*Assistant Examiner*—Johnny H. Hoang
(74) *Attorney, Agent, or Firm*—Sughrue Mion, PLLC

(57) ABSTRACT

A plasma-jet spark plug includes a metal shell, an electrical insulator retained in the metal shell, a center electrode held in an axial hole of the electrical insulator to define a cavity by a front end face of the center electrode and an inner circumferential surface of the insulator axial hole and a ground electrode arranged on a front end of the electrical insulator. The ground electrode has an opening defining portion defining an opening for communication between the cavity and the outside of the spark plug. The opening defining portion is located radially inside of or in contact with a first imaginary circular conical surface where the first imaginary circular conical surface has an axis coinciding with an axis of the spark plug and a vertex angle of 120° opening toward a front end of the spark plug and passing through a front edge of the insulator axial hole.

4 Claims, 12 Drawing Sheets

PLASMA-JET SPARK PLUG AND IGNITION SYSTEM

BACKGROUND OF THE INVENTION

The present invention relates to a plasma-jet spark plug that produces a plasma by a spark discharge to ignite an air-fuel mixture in an internal combustion engine. The present invention also relates to an ignition system using the plasma-jet spark plug.

A spark plug is widely used in an automotive internal combustion engine to ignite an air-fuel mixture by a spark discharge. In response to the recent demand for high engine output and fuel efficiency, it is desired that the spark plug increase in ignitability to show a higher ignition-limit air-fuel ratio and achieve proper lean mixture ignition and quick combustion.

One example of high-ignitability spark plug is known as a plasma-jet spark plug. The plasma-jet spark plug has a pair of center and ground electrodes defining therebetween a discharge gap and an electrical insulator surrounding the discharge gap so as to form a discharge cavity within the discharge gap. In the plasma-jet spark plug, a spark discharge is generated through the application of a high voltage between the center and ground electrodes. A phase transition of the discharge occurs by a further energy supply to eject a plasma from the discharge cavity for ignition of an air-fuel mixture in an engine combustion chamber.

The plasma can be ejected in various geometrical forms such as flame form. The plasma in flame form (occasionally referred to as "plasma flame") advantageously extends in an ejection direction and secures a large contact area with the air-fuel mixture for high ignitability.

Japanese Laid-Open Patent Publication No. 2006-294257 discloses an ignitability improvement technique in which the configuration (shape and volume) of the discharge cavity of the plasma-jet spark plug is modified to increase the ejection length of the plasma for the purpose of improvement in ignitability.

SUMMARY OF THE INVENTION

The increase of the plasma ejection length does not, however, always contribute to ignition improvement. Further, some of the configuration modifications of the discharge cavity can cause adverse influences such as deteriorations in electrode durability.

It is therefore an object of the present invention to provide a plasma-jet spark plug capable of ejecting a plasma from a discharge cavity through a ground electrode opening in such a manner as to maximize ignition performance and obtain improvement in ignitability.

It is also an object of the present invention to provide an ignition system using the plasma-jet spark plug.

As a result of extensive research and development, it has been found by the present inventors that the ignitability of the plasma-jet spark plug depends more largely on the configuration of the ground electrode opening than the configuration of the discharge cavity. The present invention is made based on such a finding.

According to one aspect of the present invention, there is provided a plasma-jet spark plug, comprising: a metal shell; an electrical insulator retained in the metal shell and formed with an axial hole; a center electrode held in the axial hole of the electrical insulator so as to define a discharge cavity by a front end face of the center electrode and an inner circumferential surface of the axial hole in a front end part of the electrical insulator; and a ground electrode formed in a plate shape, arranged on a front end of the electric insulator and connected electrically with the metal shell, the ground electrode having an opening defining portion defining therein an opening for communication between the discharge cavity and the outside of the spark plug; the opening defining portion being located radially inside of or in contact with a first imaginary circular conical surface and including a section projecting radially inwardly from a second imaginary circular conical surface with the proviso that: the first imaginary circular conical surface has an axis coinciding with an axis of the spark plug and a vertex angle of 1200 opening toward a front of the spark plug and passing through a front edge of the axial hole of the electrical insulator; and the second imaginary circular conical surface has an axis coinciding with the axis of the spark plug and a vertex angle of 60° opening toward the front of the spark plug and passing through the front edge of the axial hole of the electrical insulator; and the radially inwardly projecting section having a volume of 0 $mm^3$ to less than 1.5 $mm^3$.

According to another aspect of the present invention, there is provided an ignition system, comprising: the above plasma-jet spark plug and a power source having a capacity to supply 50 to 200 mJ of energy to the spark plug.

The other objects and features of the present invention will also become understood from the following description.

DESCRIPTION OF THE EMBODIMENTS

Figure 1:
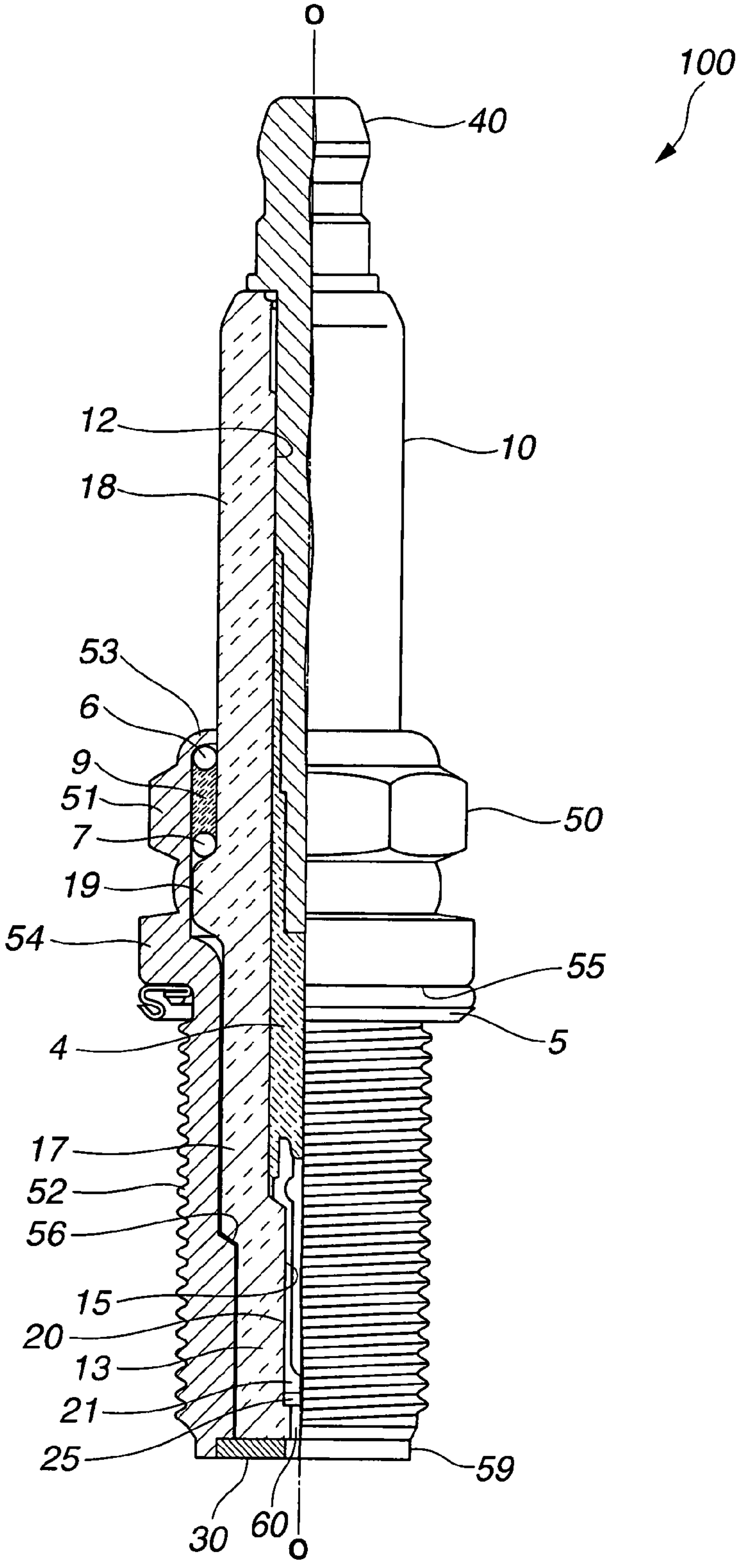
FIG. 1 is a half section view of a plasma-jet spark plug according to a first embodiment of the present invention.

The present invention will be described below in detail by way of the following first to fifth embodiments, in which like parts and portions are designated by like reference numerals.

The first embodiment of the present invention will be first explained below with reference to FIGS. 1 to 10.

Figure 2:
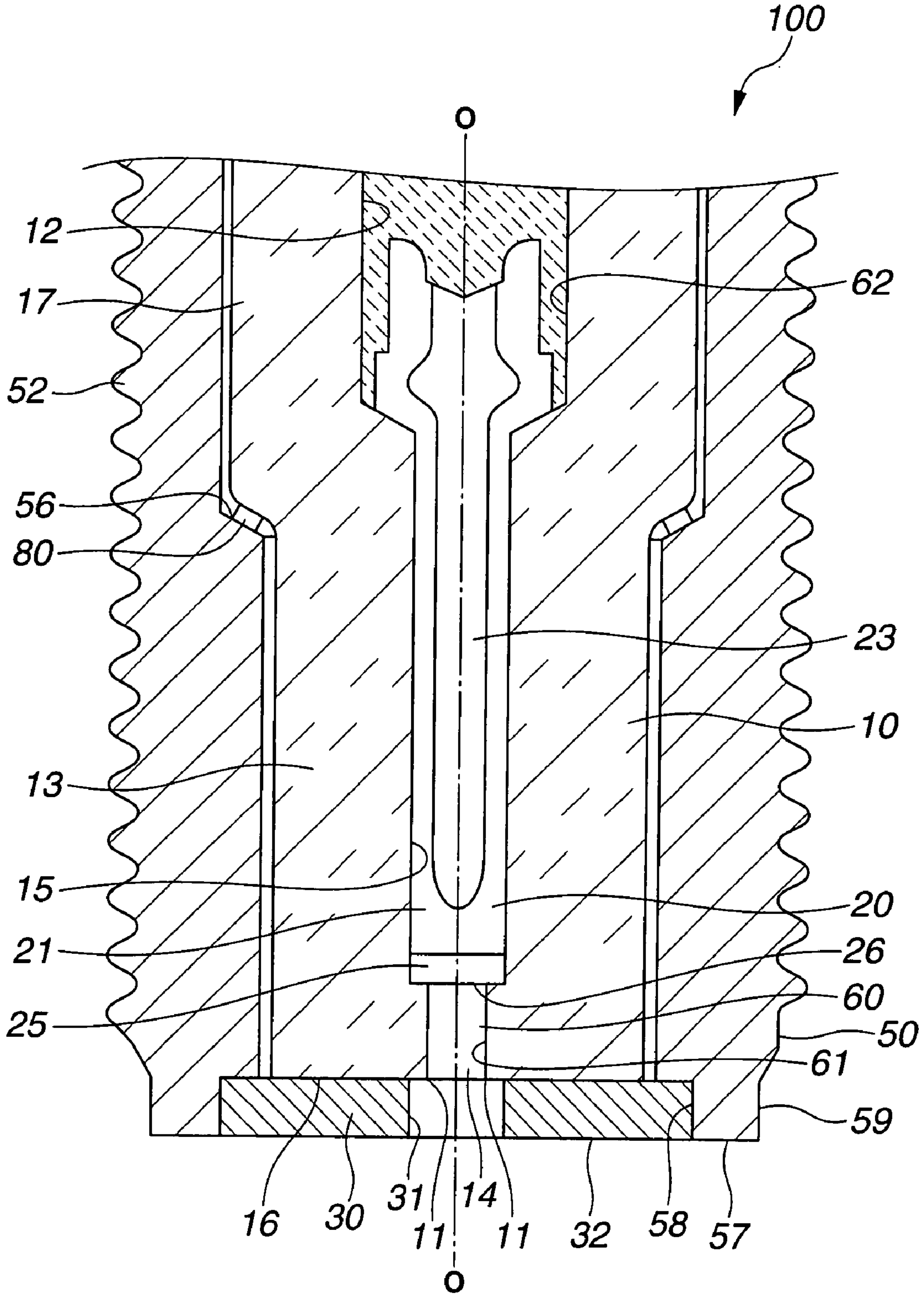
FIG. 2 is an enlarged section view of a front side of the plasma-jet spark plug according to the first embodiment of the present invention.
Figure 3:
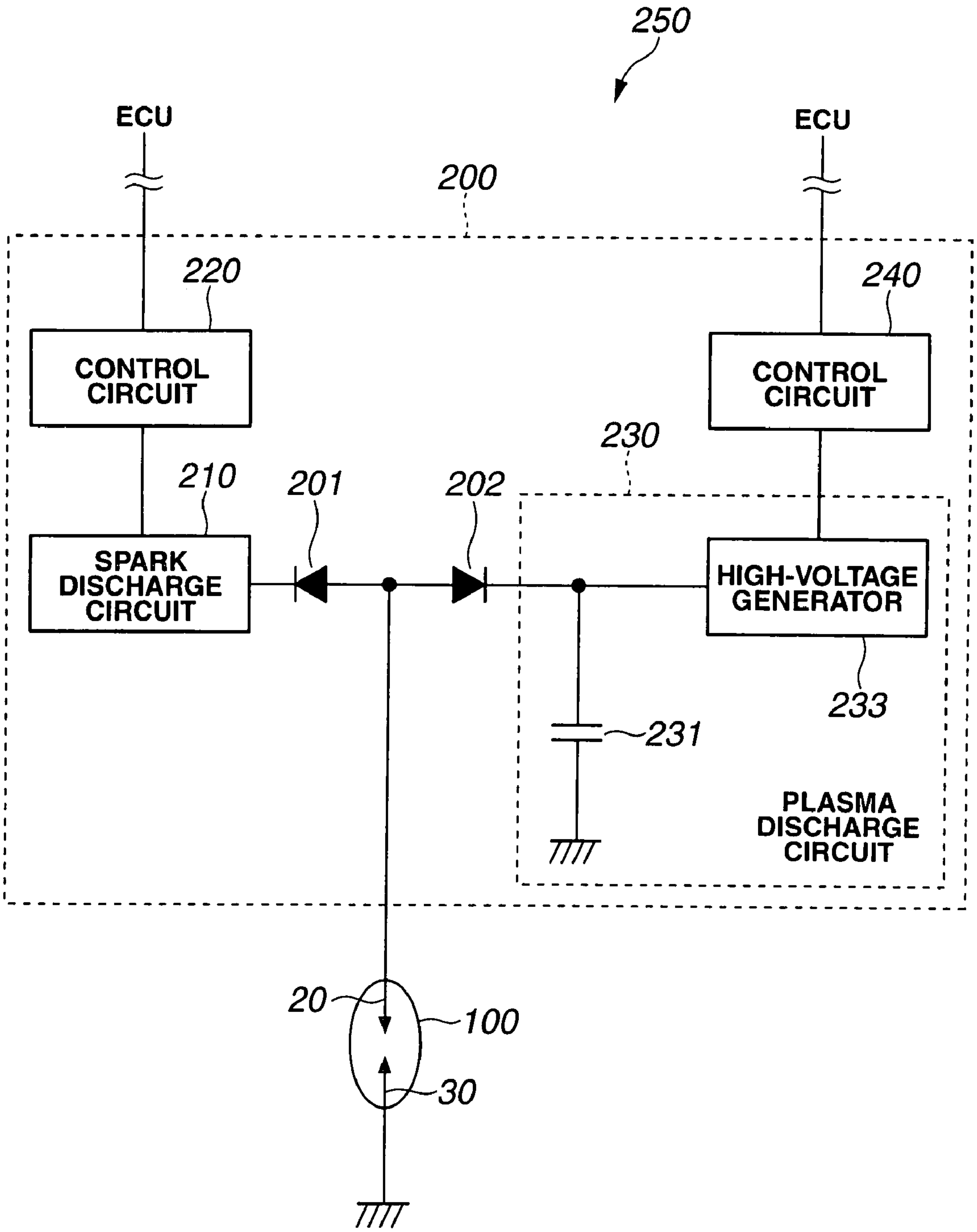
FIG. 3 is a circuit diagram of a power supply unit of an ignition system according to the first embodiment of the present invention.

As shown in FIGS. 1 to 3, an ignition system 250 of the first embodiment is provided with a plasma-jet spark plug 100 for ignition of an air-fuel mixture in an internal combustion engine and a power supply unit 200 as a power source for energization of the plasma-jet spark plug 100. In the following description, the term "front" refers to a discharge side (bottom side in FIG. 1) with respect to the direction of an axis O of the plasma-jet spark plug 100 and the term "rear" refers to a side (top side in FIG. 1) opposite the front side.

The spark plug 100 has a ceramic insulator 10 as an electrical insulator, a center electrode 20 held in a front side of the ceramic insulator 10, a metal terminal 40 held in a rear side of the ceramic insulator 10, a metal shell 50 retaining therein the ceramic insulator 10 and a ground electrode 30 joined to a front end 59 of the metal shell 50 to define a discharge gap between the center electrode 20 and the ground electrode 30.

The ceramic insulator 10 is generally formed into a cylindrical shape with an axial cylindrical through hole 12 and made of sintered alumina. As shown in FIG. 1, the ceramic insulator 10 includes a flange portion 19 protruding radially outwardly at around a middle position in the plug axis direction, a rear portion 18 located on a rear side of the flange portion 19 and having a smaller outer diameter than that of the flange portion 19, a front portion 17 located on a front side of the flange portion 19 and having a smaller outer diameter than that of the rear portion 18 and a leg portion 13 located on a front side of the front portion 17 and having a smaller outer diameter than that of the front portion 17 to form an outer stepped surface between the leg portion 13 and the front portion 17.

As shown in FIGS. 1 and 2, the insulator through hole 12 extends along the plug axis direction and includes an electrode holding region 15 located inside the insulator leg portion 13 to hold therein the center electrode 20, a front region 61 located on a front side of the electrode holding region 15 to define an opening 14 in a front end face 16 of the ceramic insulator 10 and a rear region 62 located through the front, rear and flange portions 17, 18 and 19. The front hole region 61 is made smaller in diameter than the electrode holding region 15 to form a front inner stepped surface between the front hole region 61 and the electrode holding region 15, whereas the rear hole region 62 is made larger in diameter than the electrode holding region 15 to form a rear inner stepped surface between the electrode holding region 15 and the rear hole region 62.

The center electrode 20 includes a column-shaped electrode body 21 made of nickel alloy material available under the trade name of Inconel 600 or 601, a metal core 23 made of highly thermal conductive copper material and embedded in the electrode body 21 and a disc-shaped electrode tip 25 made of precious metal and welded to a front end face of the electrode body 21 as shown in FIG. 2. A rear end of the center electrode 20 is flanged (made larger in diameter) and seated on the rear inner stepped surface of the insulator through hole 12 for proper positioning of the center electrode 20 within the electrode holding region 15 of the ceramic insulator 10. Further, a front end face 26 of the electrode tip 25 is held in contact with the front inner stepped surface of the insulator through hole 12 so that there is a small-volume concave cavity 60 (referred to as a "discharge cavity") formed within the discharge gap by an inner circumferential surface of the front region 61 of the insulator through hole 12 and a front end of the center electrode 20 (i.e. the front end face 26 of the electrode tip 25) in a front end part of the ceramic insulator 10.

The metal terminal 40 is fitted in the rear region 62 of the insulator through hole 12 and electrically connected with the center electrode 20 via a conductive seal material 4 of metal-glass composition and with a high-voltage cable via a plug cap for high voltage supply from the power supply unit 200 to the spark plug 100. The seal material 4 is filled between the rear end of the center electrode 20 and the front end of the metal terminal 40 within the rear region 62 of the insulator through hole 12 in such a manner as not only to establish electrical conduction between the center electrode 20 and the metal terminal 40 but to fix the center electrode 20 and the metal terminal 40 in position within the insulator through hole 12.

The metal shell 50 is generally formed into a cylindrical shape and made of iron material. As shown in FIGS. 1 and 2, the metal shell 50 includes a tool engagement portion 51 shaped to engage with a plug mounting tool e.g. a plug wrench, a threaded portion 52 having an inner stepped surface 56 on a front side of the tool engagement portion 51 and a flange portion 54 located between the tool engagement portion 51 and the threaded portion 52. The spark plug 100 becomes thus mounted on a cylinder block of the engine by screwing the threaded portion 52 into the engine cylinder block and seating the flange portion 54 on the engine cylinder block with a gasket 5 held between a surface of the engine cylinder block and a front surface 55 of the flange portion 54. The metal shell 50 further includes a crimp portion 53 located on a rear side of the tool engagement portion 51 and crimped onto the rear portion 18 of the ceramic insulator 10 as shown in FIG. 1. Annular rings 6 and 7 are disposed between the tool engagement and crimp portions 51 and 53 of the metal shell 50 and the rear portion 18 of the ceramic insulator 10, and a powdery talc material 9 is filled between these annular rings 6 and 7. By crimping the crimp portion 53 of the metal shell 50 onto the ceramic insulator 10 via the annular rings 6 and 7 and talc material 9, the ceramic insulator 10 is placed under pressure and urged frontward within the metal shell 50 so as to mate the outer stepped surface of the ceramic insulator 10 with the inner stepped surface 56 of the metal shell 50 via an annular packing 80 as shown in FIG. 2. The ceramic insulator 10 and the metal shell 50 is thus made integral with each other, with the annular packing 80 held between the outer stepped surface of the ceramic insulator 10 and the inner stepped surface 56 of the metal shell 50 to ensure gas seal between the ceramic insulator 10 and the metal shell 50 and prevent combustion gas leakage.

The ground electrode 30 is generally formed into a disc plate shape with an axial thickness T and made of metal material having high resistance to spark wear e.g. nickel alloy available under the trade name of Inconel 600 or 601. As shown in FIG. 2, the ground electrode 30 is integrally fixed in the front end 59 of the metal shell 50, so as to establish a ground for the spark plug 100 through the metal shell 50, by laser welding an outer circumferential surface of the ground electrode 30 to an inner surface 58 of the front end 59 of the metal shell 50. A rear end face of the ground electrode 30 is fitted to and held in contact with the front end face 16 of the ceramic insulator 10 whereas a front face 32 of the ground electrode 30 is aligned to a front end face 57 of the metal shell 50. Further, the ground electrode 30 has a cylindrical opening 31 formed in the center thereof to provide communication between the discharge cavity 60 and the outside of the spark plug 100. The opening 31 has a minimum diameter D larger than or equal to a diameter R of the opening 14 of the ceramic insulator 10.

On the other hand, the power supply unit 200 is connected to an electric control unit (ECU) of the engine and has a spark discharge circuit 210, a control circuit 220, a plasma discharge circuit 230, a control circuit 240 and backflow prevention diodes 201 and 202 so as to energize the spark plug 100 in response to an ignition control signal (indicative of ignition timing) from the ECU as shown in FIG. 3.

The spark discharge circuit 210 is a capacitor discharge ignition (CDI) circuit and electrically connected with the center electrode 20 of the spark plug 100 via the diode 201 so as to place a high voltage between the electrodes 20 and 30 of the spark plug 100 and thereby induce a so-called trigger discharge phenomenon in the discharge gap. In the present embodiment, the sign of potential of the spark discharge circuit 210 and the direction of the diode 201 are set in such a manner as to allow a flow of electric current from the ground electrode 30 to the center electrode 20 during the trigger discharge phenomenon. The spark discharge circuit 210 may alternatively be of full-transistor type, point (contact) type or any other ignition circuit type.

The plasma discharge circuit 230 is electrically connected with the center electrode 20 of the spark plug 100 via the diode 202 so as to supply a high energy to the discharge gap of the spark plug 100 and thereby induce a so-called plasma discharge phenomenon in the discharge cavity 60. As shown in FIG. 3, the plasma discharge circuit 230 is a capacitor discharge ignition (CDI) circuit provided with a capacitor 231 and a high-voltage generator 233. One end of the capacitor 231 is connected to a ground, whereas the other end of the capacitor 231 is connected to the center electrode 20 of the spark plug 100 via the diode 202 and to the high-voltage generator 233. With this configuration, the capacitor 231 becomes charged with a negative-polarity voltage from the high-voltage generator 233 and supplies such a high charge energy to the discharge gap of the spark plug 100. The sign of potential of the high-voltage generator 233 and the direction of the diode 202 are also set in such a manner as to allow a flow of electric current from the ground electrode 30 to the center electrode 20 during the plasma discharge phenomenon. Alternatively, the plasma discharge circuit 230 may be of any other ignition circuit type such as full-transistor type or point (contact) type.

The control circuits 220 and 240 receive the ignition control signal from the ECU and control the operations of the spark and plasma discharge circuits 210 and 230 at the ignition timing indicated by the ignition control signal.

Before the ignition timing, the diodes 201 and 202 are operated to prevent the backflow of power to the spark plug 100. In this state, the capacitor 231 and the high-voltage generator 233 forms a closed circuit in which the output voltage of the high-voltage generator 233 is charged to the capacitor 231.

At the ignition timing, the control circuit 220 enables the spark discharge circuit 210 to place a high voltage energy between the electrodes 20 and 30 of the spark plug 100. Then, the spark plug 100 induces a trigger discharge phenomenon in which a spark occurs with an electrical breakdown within the discharge gap. The electrical breakdown allows a passage of electricity even through the application of a relatively small voltage. When the control circuit 240 enables the capacitor 231 of the plasma discharge circuit 230 to supply a charged voltage energy to the discharge gap of the spark plug 100 during the occurrence of the trigger discharge phenomenon, the spark plug 100 subsequently induces a plasma discharge phenomenon in which the gas inside the discharge cavity 60 becomes ionized into a plasma phase. The thus-produced high-energy plasma is ejected from the discharge cavity 60 to the engine combustion chamber through the insulator opening 14 and the ground electrode opening 31. The air-fuel mixture is ignited with such a high-energy plasma discharge and combusted through flame kernel growth in the engine combustion chamber.

The energy supply to the discharge gap is finished to insulate the discharge gap after the capacitor 231 releases its charge energy. Then, the capacitor 231 and the high-voltage generator 233 again form a closed circuit so that the capacitor 231 becomes charged with the output voltage of high-voltage generator 233. Upon receipt of the next ignition control signal from the ECU, the control circuits 220 and 240 enable the discharge circuits 210 and 230 to provide an energy supply to the spark plug 100 for plasma discharge.

Herein, the degree of growth of the plasma increases with the amount of energy supplied to the spark plug 100 (i.e. the sum of the amount of energy supplied from the spark discharge circuit 210 to induce the trigger discharge phenomenon and the amount of energy supplied from the capacitor 231 of the plasma discharge circuit 230 to induce the plasma discharge phenomenon). It is preferable to supply at least 50 mJ of energy for one plasma ejection (shot) in order to produce a sufficient and effective plasma and secure a larger contact area between the plasma and the air-fuel mixture for high ignitability. In view of the consumptions of the center and ground electrodes 20 and 30 (notably, the ground electrode 30) of the spark plug 100, it is preferable to limit the energy supply amount to 200 mJ or less. In other words, the power supply unit 200 is preferably of 50 to 200 mJ capacity, and more specifically, 140 mJ capacity. In the present embodiment, the capacitance of the capacitor 231 is set in such a manner that the total amount of energy supplied from the discharge circuits 210 and 230 to the spark plug 100 takes an appropriate value within the range of 50 to 200 mJ, and more specifically, 140 mJ.

When the plasma comes in contact with the ground electrode 30 during the growth, the ground electrode 30 absorbs heat from and quenches the plasma. The configuration (size and shape) of the opening 31 of the ground electrode 30 is thus controlled so as to reduce such a quenching effect of the ground electrode 30 and generate an effective plasma discharge for proper and assured ignition of the air-fuel mixture without causing durability deteriorations of the center and ground electrodes 20 and 30.

Figure 4:
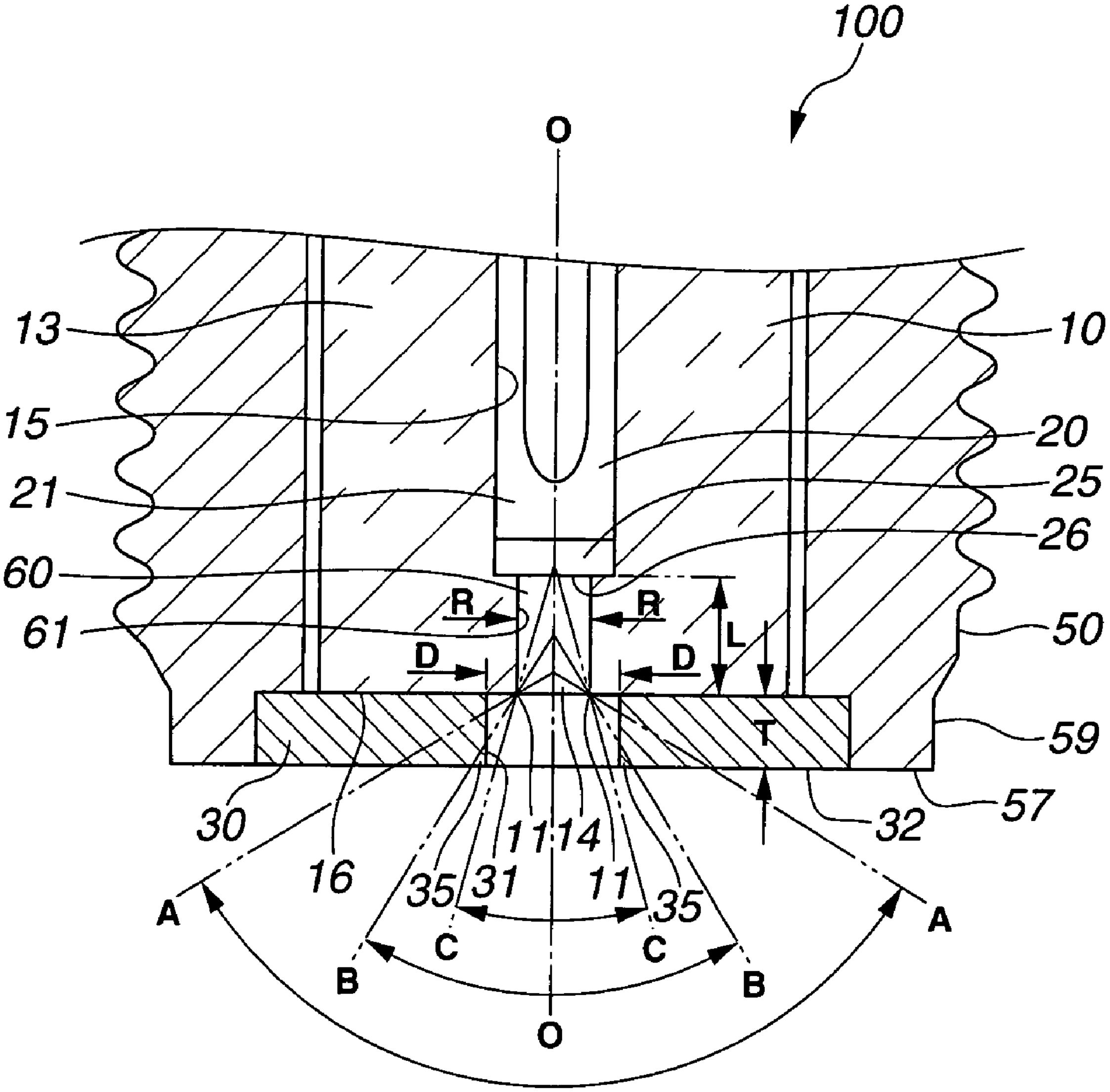
FIG. 4 is an enlarged section view of a ground electrode of the plasma-jet spark plug, in the case where the ground electrode has an opening defining portion projecting radially inwardly from a first imaginary circular conical surface, according to the first embodiment of the present invention.
Figure 5:
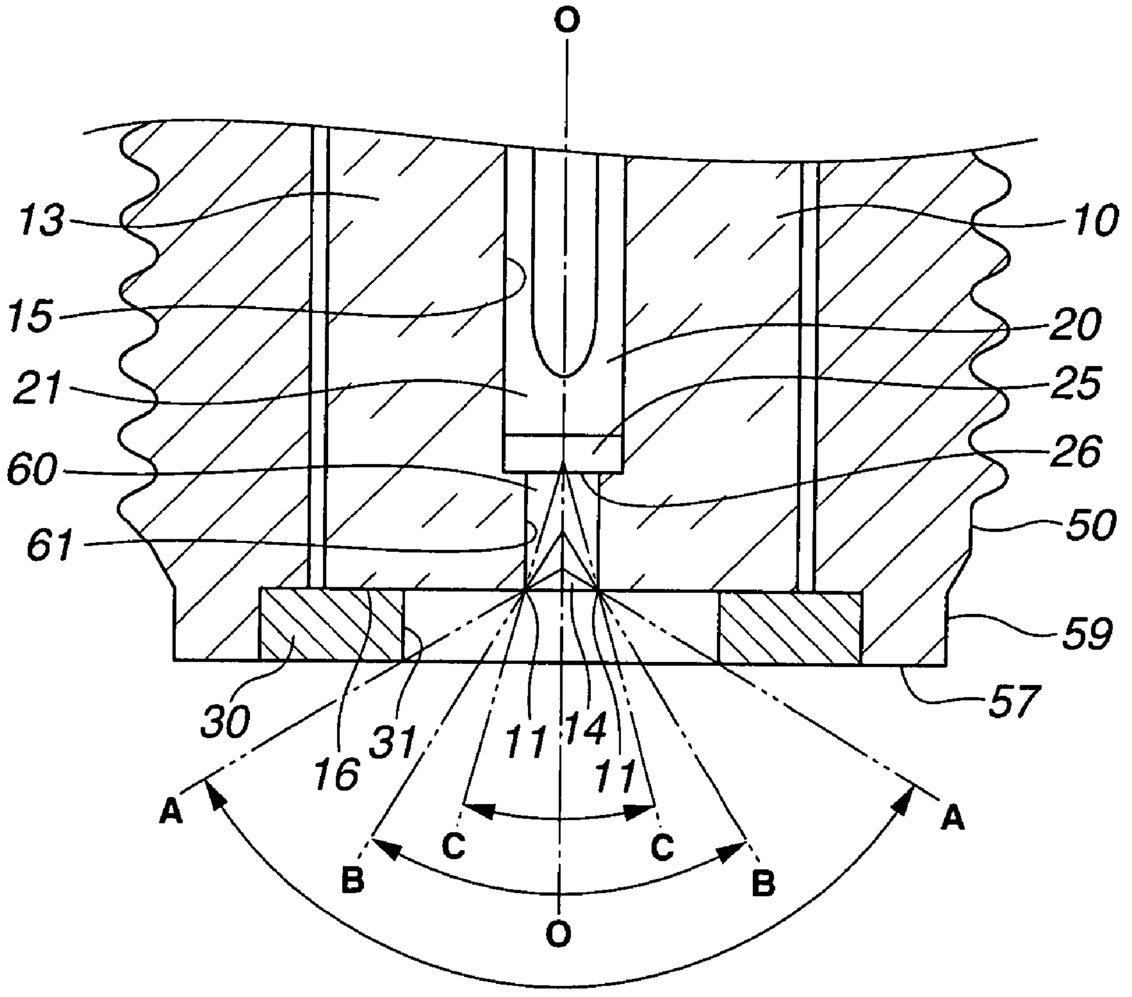
FIG. 5 is an enlarged section view of the ground electrode of the plasma-jet spark plug, in the case where the opening defining portion of the ground electrode is in contact with the first imaginary circular conical surface, according to the first embodiment of the present invention.

More specifically, the ground electrode 30 has a portion, which defines the opening 31, in its entirety or in part projecting radially inwardly from and located radially inside of or in contact with a first imaginary circular conical surface with the proviso that the first imaginary circular conical surface is the conical surface of a right circular cone having an axis coinciding with the axis O of the spark plug 100 and a vertex angle of 120° opening toward the front of the spark plug 100 and passing through (held in contact with) a front edge 11 of the opening 14 of the insulator through hole 12 as indicated by a double dashed line A in FIGS. 4 and 5. For plasma formation, a spark discharge has to be generated within the discharge gap between the center and ground electrodes 20 and 30. When such an opening defining portion of the ground electrode 30 is located radially inside of or in contact with the first imaginary circular conical surface, the size of the discharge gap between the center and ground electrodes 20 and 30 becomes so limited as not to cause a substantial increase in the voltage required to generate the spark discharge. This makes it possible to reduce the consumption of the center electrode 20 (notably, the electrode tip 25) and the ground electrode 30 and maintain the durability of the center and ground electrodes 20 and 30.

When the opening defining portion of the ground electrode 30 is located radially inside of the first imaginary circular conical surface, this opening defining portion may include a section 35 projecting radially inwardly from and located radially inside of a second imaginary circular conical surface with the proviso that the second imaginary circular conical surface is the conical surface of a right circular cone having an axis coinciding with the axis of the spark plug 100 and a vertex angle of 60° opening toward the front of the spark plug 100 and passing through (held in contact with) the front opening edge 11 of the ceramic insulator 10 as indicated by a double dashed line B in FIG. 4. In such a case, the volume of the section 35 of the ground electrode 30 projecting radially inwardly from the second imaginary circular conical surface (occasionally just referred to as "projection") is controlled to be smaller than 1.5 $mm^3$. It is needless to say that the volume of the projection 35 of the ground electrode 30 is zero (0 $mm^3$) when the opening defining portion of the ground electrode 30 is in contact with the first imaginary circular conical surface and when the opening defining portion of the ground electrode 30 is located radially inside of the first imaginary circular conical surface but includes no section projecting radially inwardly from the second imaginary circular conical surface.

As the plasma grows in not only an ejection direction but also directions perpendicular to the ejection direction, the amount (volume) of contact between the plasma and the ground electrode 30 varies depending on the minimum diameter D of the opening 31 of the ground electrode 30 and the thickness T of the ground electrode 30. When the projection 35 of the ground electrode 30 is smaller in volume than 1.5 $mm^3$, the amount of contact between the plasma and the ground electrode 30 in the early stage of the plasma growth can be decreased so that it becomes unlikely that the ground electrode 30 will absorb heat from the plasma. This makes it possible to reduce the quenching effect of the ground electrode 30 and effectively prevent the ignitability of the spark plug 100 from deteriorating due to such a quenching effect of the ground electrode 30.

In order to avoid the contact between the plasma and the ground electrode 30 in the early stage of the plasma growth and prevent the spark plug 100 from deteriorating in ignitability due to the quenching effect of the ground electrode 30 more assuredly, the opening defining portion of the ground electrode 30 is preferably kept from contact with a third imaginary circular conical surface with the proviso that the third imaginary circular conical surface is the conical surface of a right circular cone having an axis coinciding with the axis of the spark plug 100 and a vertex angle of 30° opening toward the front of the spark plug 100 and passing through (held in contact with) the front opening edge 11 of the ceramic insulator 10 as indicated by a double dashed line C in FIGS. 4 and 5.

Further, the minimum diameter D of the opening 31 of the ground electrode 31 is preferably made larger than or equal to the thickness T of the ground electrode 31. The plasma radiates from its center to its peripheral edge and becomes higher in temperature as closer to the center and lower in temperature as closer to the peripheral edge. It is very likely that, upon contact between the plasma and the ground electrode 30, the ground electrode 30 will absorb a larger amount of heat from the high-temperature center area of the plasma (located on an around the axis O the spark plug 100) than from the low-temperature peripheral edge area of the plasma. In view of the quenching effect of the ground electrode 30, it is thus desirable that the center area of the plasma does not come into contact with the ground electrode 30 even if the peripheral edge area of the plasma comes into contact with the ground electrode 30. As mentioned above, the amount (volume) of contact between the plasma and the ground electrode 30 varies depending on the minimum diameter D of the opening 31 of the ground electrode 30 and the thickness T of the ground electrode 30. In the case where the diameter D of the opening 31 of the ground electrode 30 is held constant, the amount of contact between the plasma and the ground electrode 30 increases with the thickness T of the ground electrode 30. When the minimum diameter D of the opening 31 of the ground electrode 31 is larger than or equal to the thickness T of the ground electrode 31, the contact between the center area of the plasma and the ground electrode 30 can be avoided or minimized. This makes it possible to reduce the quenching effect of the ground electrode 30 and secure high ignitability of the spark plug 100 effectively. This also makes it possible to avoid the durability of the ground electrode 30 from becoming low due to a decrease in the ground electrode thickness T.

In the case where the minimum diameter D of the ground electrode opening 31 decreases with the diameter R of the cavity opening edge 11 for miniaturization of the spark plug 100, the ground electrode 30 becomes located nearer to the center area of the plasma and thus likely to absorb heat from the plasma. Even in this case, the ignitability deterioration of the spark plug 100 can be prevented effectively by setting the above relationship of $D \geqq T$ between the minimum opening diameter D and thickness T of the ground electrode 30.

With the above opening configuration of the ground electrode 30, the spark plug 100 becomes able to reduce the quenching effect of the ground electrode 30, produce an effective plasma, without a substantial increase in the voltage required for the spark discharge, and attain proper and assured ignition of the air-fuel mixture. It is therefore possible for the spark plug 100 to attain both of high ignitability and durability.

Figure 11:
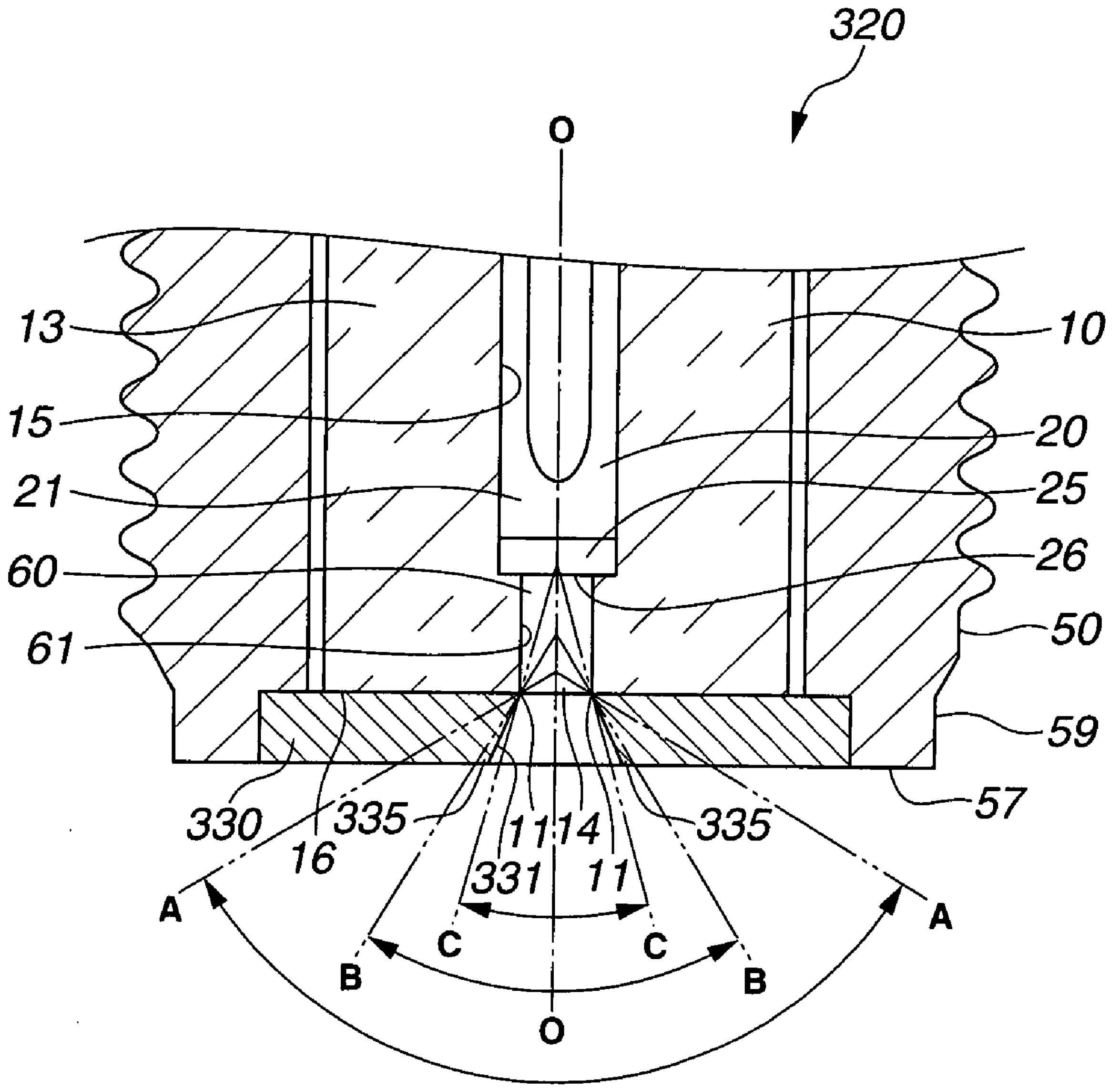
FIG. 11 is an enlarged section view of a front side of a plasma-jet spark plug according to a second embodiment of the present invention.

The second embodiment of the present invention will be next explained below with reference to FIG. 11. A plasma-jet spark plug 320 of the second embodiment is structurally similar to the spark plug 100 of the first embodiment, except that the spark plug 320 has a ground electrode 330 formed with a tapered opening 331 for communication between the discharge cavity 60 and the outside of the spark plug 320 as shown in FIG. 11. The opening 331 has a diameter gradually increasing toward a front end of the ground electrode 330. As in the case of the first embodiment, the ground electrode 330 has a portion, which defines the opening 331, located radially inside of or in contact with the first imaginary circular conical surface. The opening defining portion of the ground electrode 330 may include a projection 335 (projecting radially inwardly from the second imaginary circular conical surface) with a projection volume of less than 1.5 $mm^3$. The opening defining portion of the ground electrode 330 is preferably kept from contact with the third imaginary circular conical surface. Further, the ground electrode 330 preferably satisfy the dimensional relationship of $D \geqq T$ where D is a minimum diameter of the opening 331 of the ground electrode 330; and T is an axial thickness of the ground electrode 330.

Figure 12:
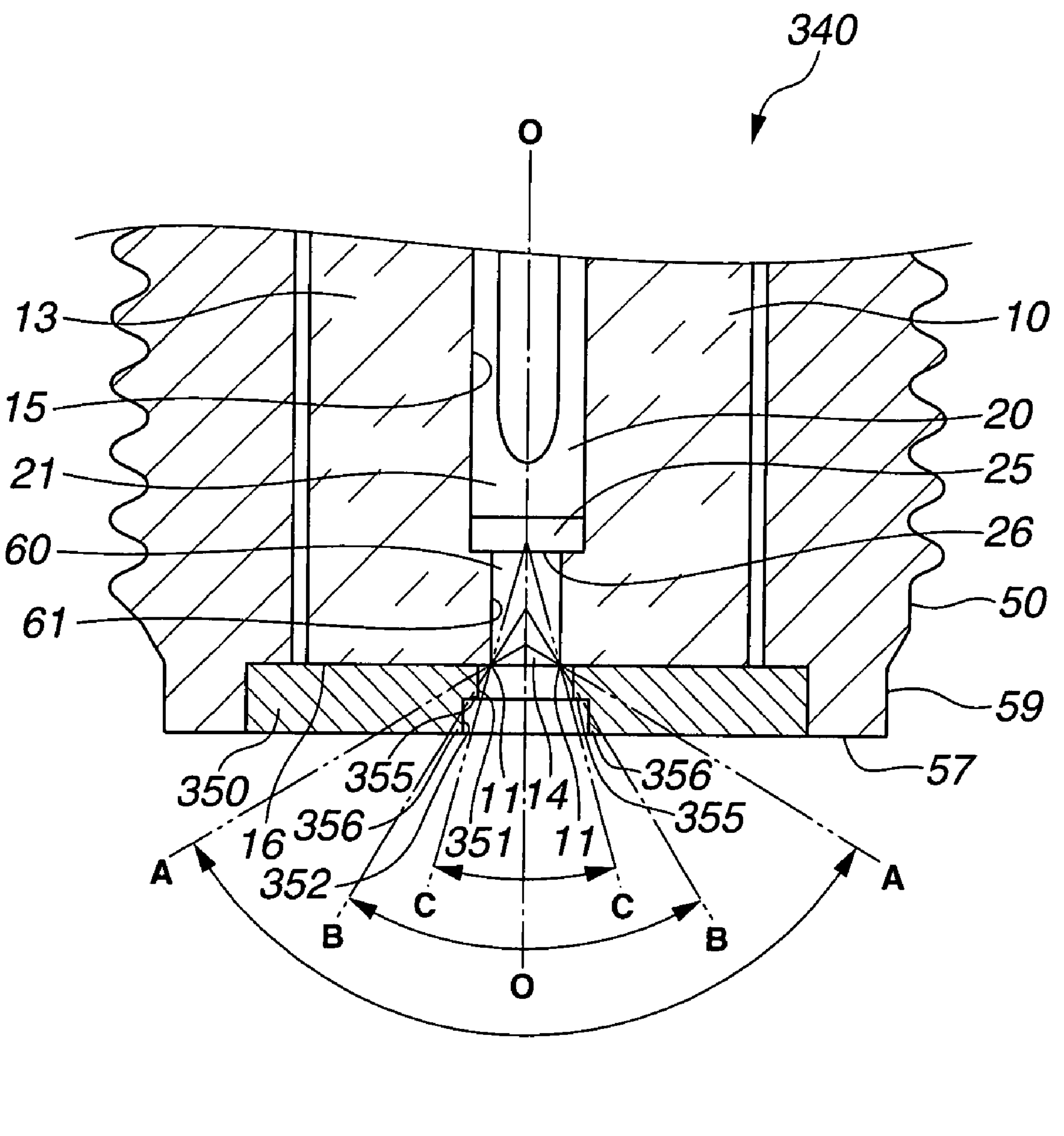
FIG. 12 is an enlarged section view of a front side of a plasma-jet spark plug according to a third embodiment of the present invention.

The third embodiment of the present invention will be explained below with reference to FIG. 12. A plasma-jet spark plug 340 of the third embodiment is structurally similar to the spark plug 100 of the first embodiment, except that the spark plug 340 has a ground electrode 350 formed with two coaxial cylindrical opening regions 351 and 352 to define an opening for communication between the discharge cavity 60 and the outside of the spark plug 340 as shown in FIG. 12. The opening region 351 is made smaller in diameter than the opening region 352 to form a step between the opening regions 351 and 352. Alternatively, the opening may consists of three or more opening regions. As in the case of the first embodiment, the ground electrode 350 has a portion, which defines the opening regions 351 and 352, located radially inside of or in contact with the first imaginary circular conical surface. The opening defining portion of the ground electrode 350 may include projections 355 and 356 (projecting radially inwardly from the second imaginary circular conical surface) with a total projection volume of less than 1.5 $mm^3$. The opening defining portion of the ground electrode 350 is preferably kept from contact with the third imaginary circular conical surface. Further, the ground electrode 350 preferably satisfy the dimensional relationship of $D \geqq T$ where D is a minimum diameter of the opening (a diameter of the opening section 351) of the ground electrode 350; and T is an axial thickness of the ground electrode 350.

Figure 13:
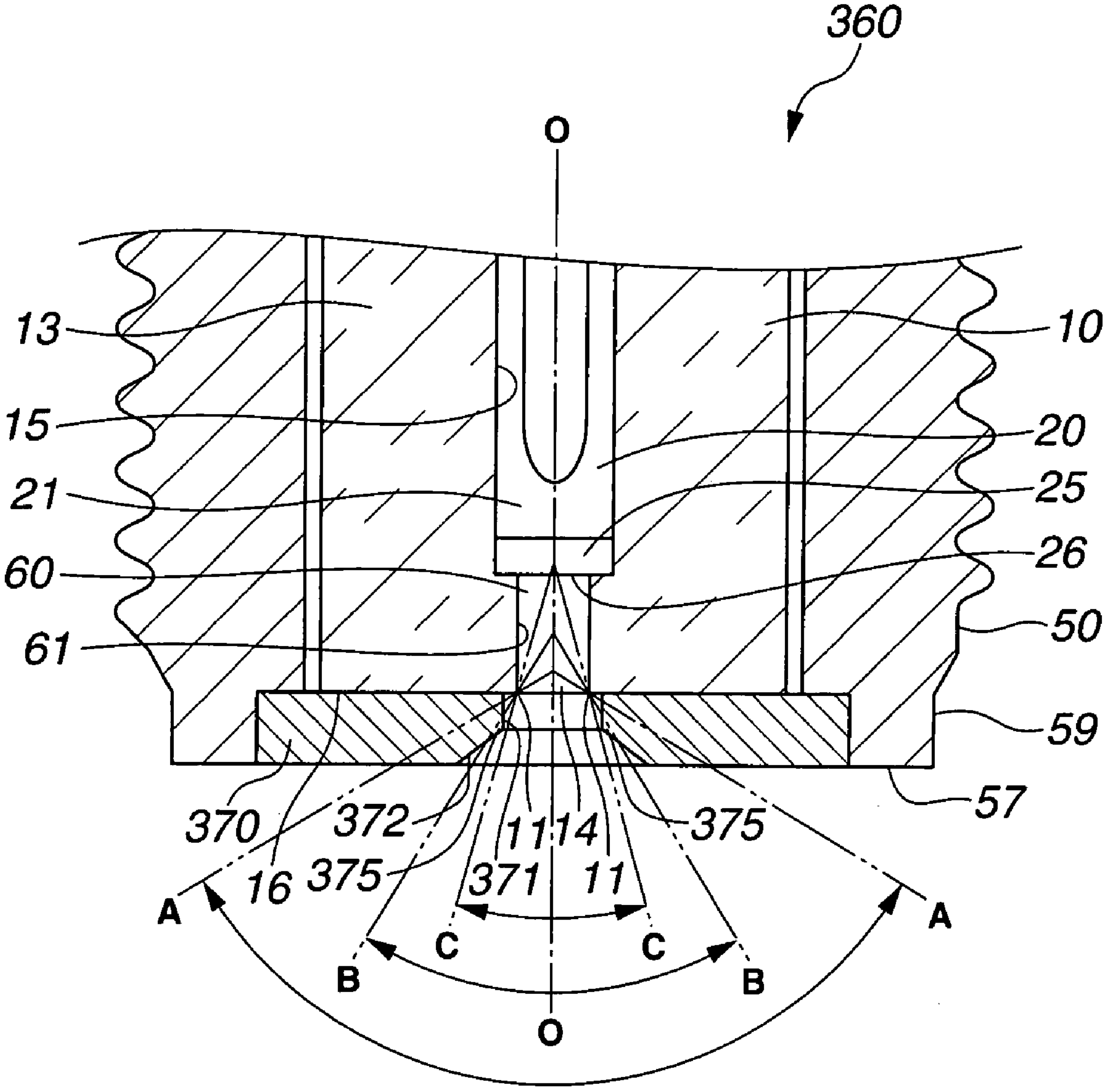
FIG. 13 is an enlarged section view of a front side of a plasma-jet spark plug according to a fourth embodiment of the present invention.

The fourth embodiment of the present invention will be explained below with reference to FIG. 13. A plasma-jet spark plug 360 of the fourth embodiment is structurally similar to the spark plug 340 of the third embodiment, except that the spark plug 360 has a ground electrode 370 formed with a cylindrical opening section 371 and a tapered opening section 372 to define an opening for communication between the discharge cavity 60 and the outside of the spark plug 360 as shown in FIG. 13. The ground electrode 370 also has a portion, which defines the opening regions 371 and 372, located radially inside of or in contact with the first imaginary circular conical surface. The opening defining portion of the ground electrode 370 may include a projection 375 (projecting radially inwardly from the second imaginary circular conical surface) with a projection volume of less than 1.5 $mm^3$. The opening defining portion of the ground electrode 370 is preferably kept from contact with the third imaginary circular conical surface. Further, the ground electrode 370 preferably satisfy the dimensional relationship of $D \geqq T$ where D is a minimum diameter of the opening (a diameter of the opening section 371) of the ground electrode 370; and T is an axial thickness of the ground electrode 370.

Figure 14:
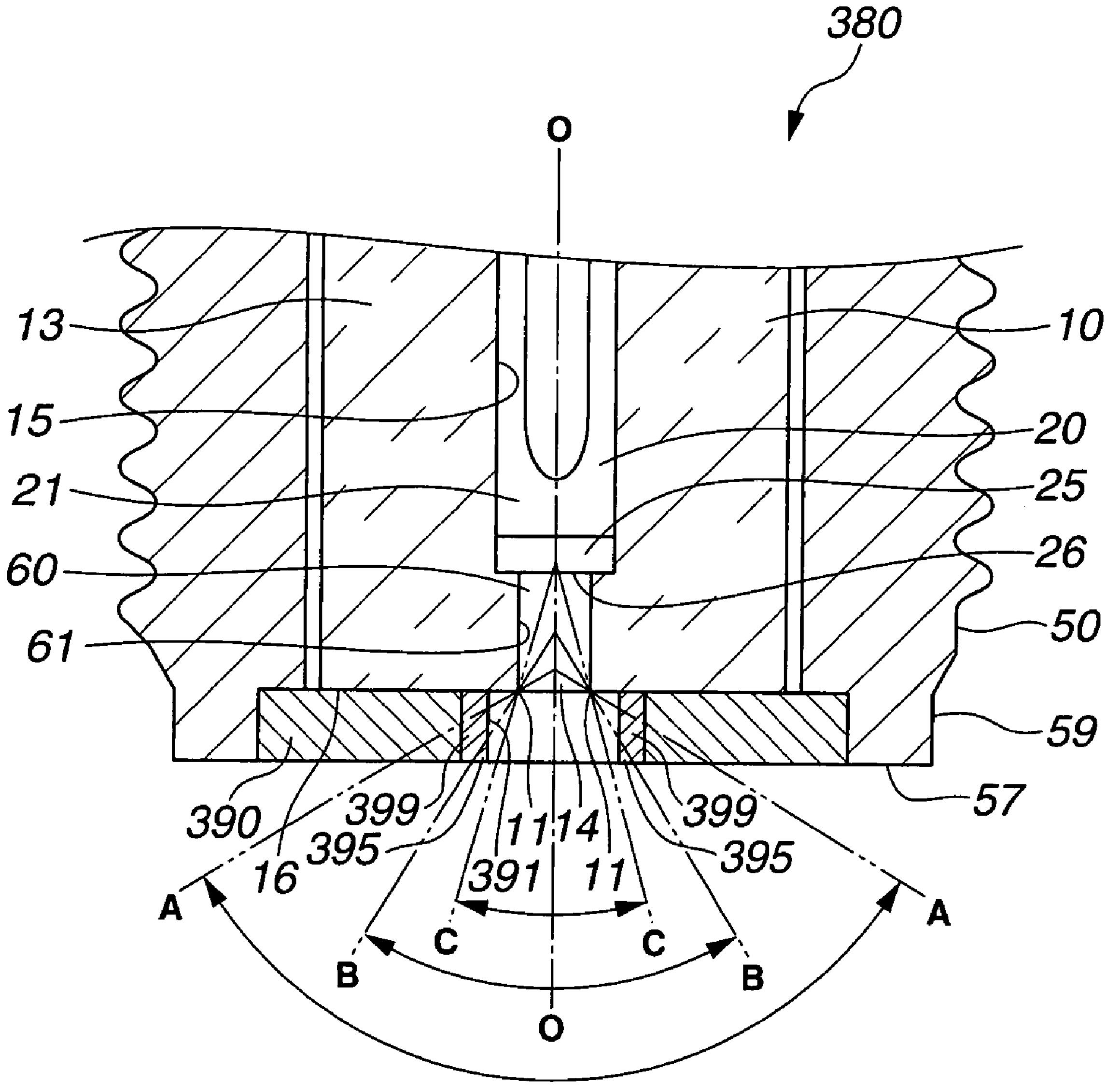
FIG. 14 is an enlarged section view of a front side of a plasma-jet spark plug according to a fifth embodiment of the present invention.

Finally, the fifth embodiment of the present invention will be explained below with reference to FIG. 14. A plasma-jet spark plug 380 of the fifth embodiment is structurally similar to the spark plug 100 of the first embodiment, except that the spark plug 380 has a ground electrode 390 provided with an electrode tip 399 of precious metal or tungsten alloy to define an opening 391 for communication between the discharge cavity 60 and the outside of the spark plug 380 as shown in FIG. 14. As in the case of the first embodiment, the ground electrode 390 has a portion that defines the opening 391, i.e., the electrode tip 399 located radially inside of or in contact with the first imaginary circular conical surface. The opening defining portion of the ground electrode 390 may include a projection 395 (projecting radially inwardly from the second imaginary circular conical surface) with a projection volume of less than 1.5 $mm^3$. The opening defining portion of the ground electrode 390 is preferably kept from contact with the third imaginary circular conical surface. Further, the ground electrode 390 preferably satisfy the dimensional relationship of $D \geqq T$ where D is a minimum diameter of the opening 391 of the ground electrode 390; and T is an axial thickness of the ground electrode 390.

The present invention will be described in more detail with reference to the following examples. It should be however noted that the following examples are only illustrative and not intended to limit the invention thereto.

Experiment 1

Figure 6:
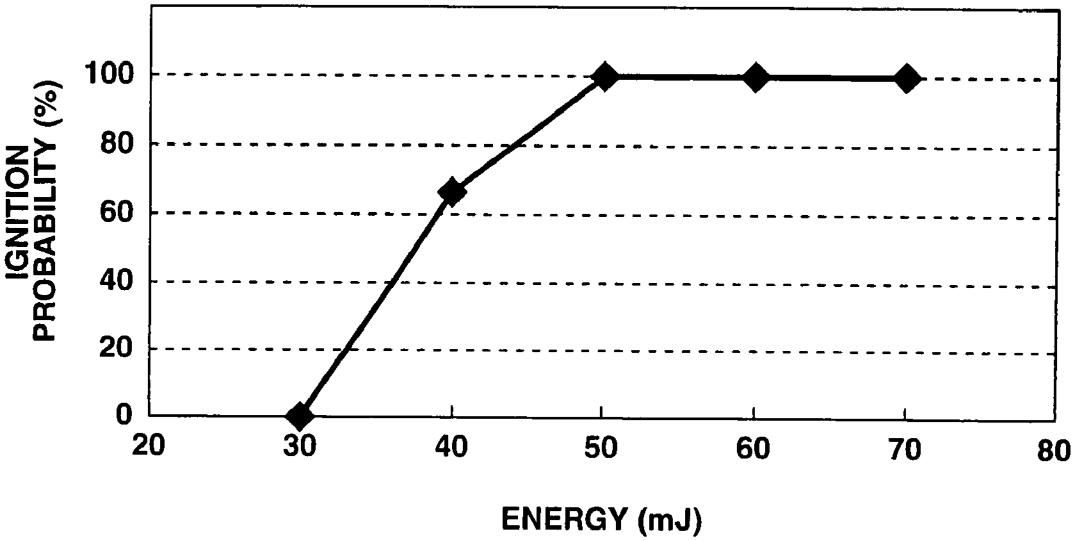
FIGS. 6 to 10 are graphs showing experimental data on ignition probability, electrode consumption and discharge voltage of the plasma-jet spark plug according the first embodiment of the present invention.

A test sample of the spark plug 100 was produced with the following dimensions: D=1.0 mm, T=1.0 mm, R=0.5 mm and L=2.0 mm where D was the minimum diameter of the opening 31 of the ground electrode 30; T was the axial thickness of the ground electrode 30; R was the diameter of the discharge cavity 60 (the diameter of the insulator opening 14 at the front opening edge 11); and L was the depth of the discharge cavity 60 (the distance between the front end face 16 of the ceramic insulator 10 and the front end face 26 of the center electrode 20 along the plug axis direction). The test sample was then subjected to ignitability test. The ignitability test was conducted by mounting the test sample in a pressure chamber, charging the chamber with a mixture of air and $C_3H_8$ fuel gas (air-fuel ratio: 22) to a pressure of 0.05 MPa, activating the test sample by means of a CDI-circuit power source and monitoring the pressure in the chamber with a pressure sensor to judge the success or failure of ignition of the air-fuel mixture. The output of the power source was varied from 30 to 70 mJ by using various power coils. The ignition probability of the test sample was determined by performing the above series of process steps 100 times at each energy level. The test results are indicated in FIG. 6. The test sample failed to cause ignition by the energy supply of 30 mJ and had an ignition probability of about 65% by the energy supply of 40 mJ. By contrast, the test sample had an ignition probability of 100% by the energy supply of 50 mJ or more. It has been thus shown that the plasma can be ejected from spark plug 100 effectively to obtain sufficient ignitability by supplying at least 50 mJ of energy to the spark plug 100.

Experiment 2

Figure 7:
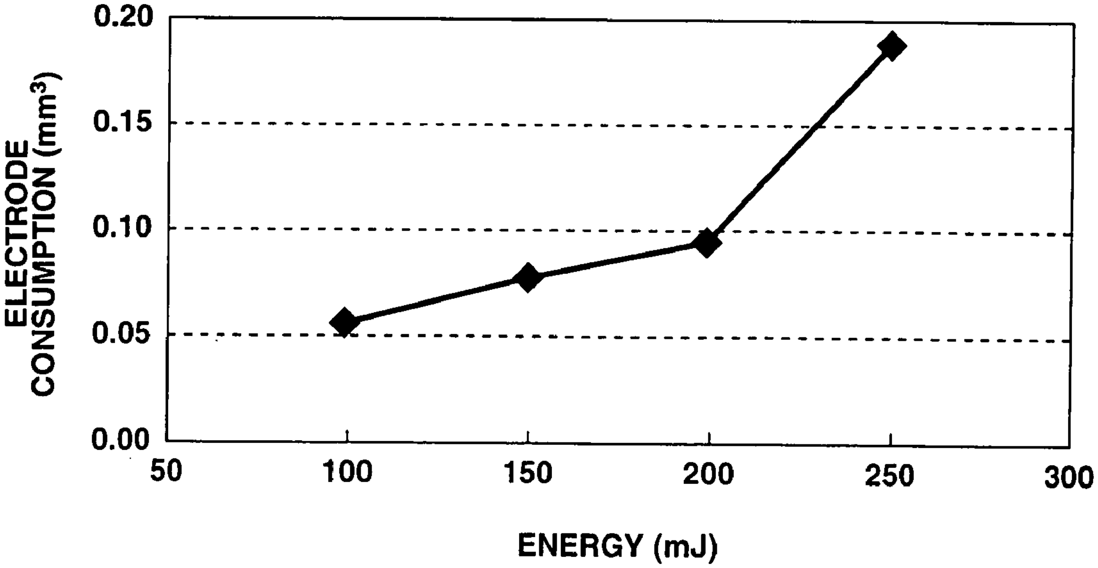

Test samples of the spark plug 100 were produced in the same manner as in Experiment 1 and subjected to durability test. In each of the test samples, the ground electrode 30 was made of Ir-5Pt alloy. The durability test was conducted by charging a pressure chamber with $N_2$ gas to a pressure of 0.4 MPa, mounting the test sample in the pressure chamber, activating the test sample by means of a CDI-circuit power source to cause a continuous discharge at 60 Hz for 200 hours and measuring the amount of consumption of the ground electrode 30 during the continuous discharge. The output of the power source was varied from sample to sample. The test results are indicated in FIG. 7. The test sample had an electrode consumption of about 0.06 $mm^3$ by the energy supply of 100 mJ. The test sample had an electrode consumption of about 0.08 $mm^3$ by the energy supply of 150 mJ. Further, the test sample had an electrode consumption of slightly less than 0.10 $mm^3$ by the energy supply of 200 mJ. The electrode consumption amount significantly increased when the energy supply exceeded 200 mJ, and the test sample had an electrode consumption of about 0.19 $mm^3$ by the energy supply of 250 mJ. It has been thus shown that the electrode consumption of the spark plug 100 can be limited to a relatively low level to prevent a durability deterioration by supplying 200 mJ or less of energy to the spark plug 100.

Experiment 3

Figure 8:
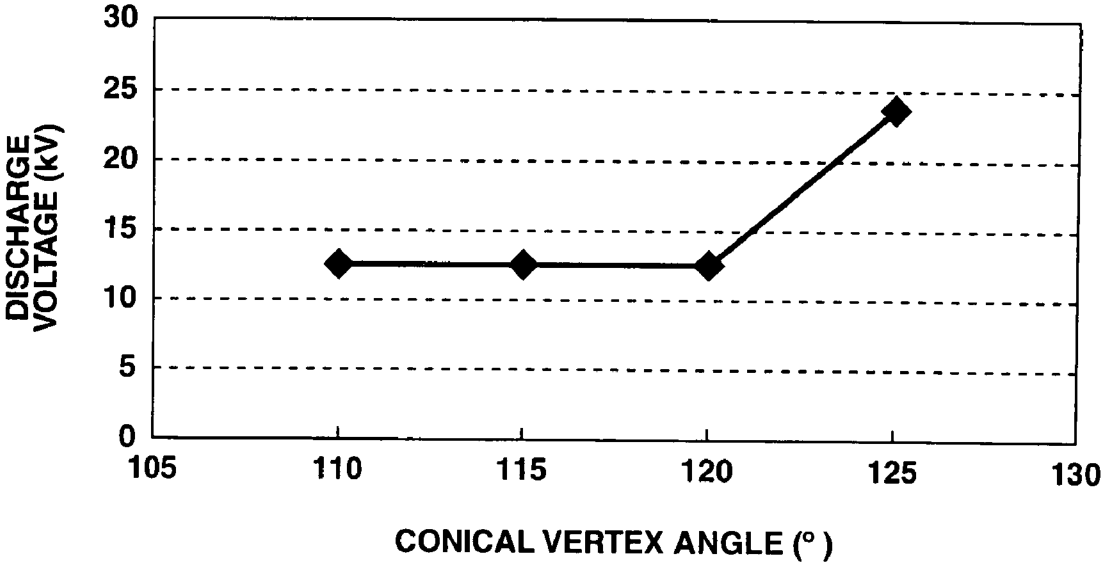

Three test samples of the spark plug 100 were produced with the following dimensions: T=1.0 mm, R=0.5 mm and L=2.0 mm. In these three test samples, the opening 31 of the ground electrode 30 was formed in such a manner that the opening defining portion of the ground electrode 30 was in contact with an imaginary circular surface line having a vertex angle of 110°, 115° and 120°. A test sample of comparative spark plug was produced under the same conditions as above except that the opening defining portion of the ground electrode was in contact with an imaginary circular conical surface line having a vertex angle of 125°. Each of the test samples was then subjected to discharge test. The discharge test was conducted by charging a pressure chamber with $N_2$ gas to a pressure of 0.4 MPa, mounting the test sample in the pressure chamber and activating the test sample by means of a power source of 140-mJ capacity to measure a discharge voltage required for the test sample to cause a continuous discharge for 200 hours. The test results are indicated in FIG. 8. The test sample required a discharge voltage of less than 15 kV for the continuous discharge, regardless of the occurrence of electrode consumption, when the opening defining portion of the ground electrode 30 were in contact the imaginary circular conical surface with 110°, 115° and 120° vertex angle. However, the test sample required a much higher discharge voltage of about 25 kV when the opening defining portion of the ground electrode were in contact with the imaginary circular conical surface with 125° vertex angle. It has been thus shown that the discharge voltage required for the discharge of the spark plug 100 can be limited to a relatively low level so as to reduce electrode consumption by allowing the opening defining portion of the ground electrode 30 to be located radially inside of or in contact with the first imaginary circular conical surface with 120° vertex angle.

Experiment 4

Figure 9:
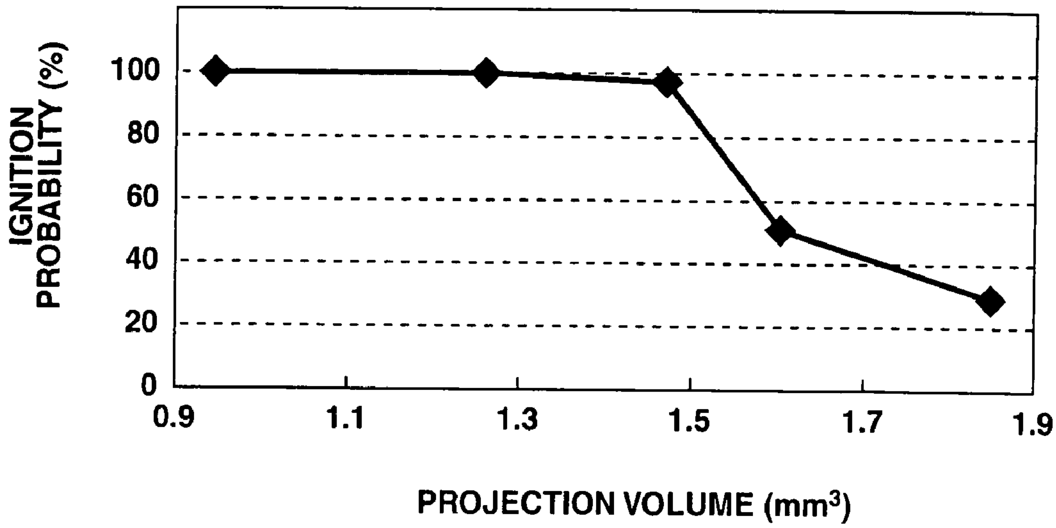

Three test samples of the spark plug 100 were produced in such a manner that the projection 35 of the ground electrode 30 had a volume of 0.9 $mm^3$ to less than 1.5 $mm^3$. Test samples of comparative spark plugs were produced under the same conditions as above except that the projection of the ground electrode had a volume of 1.5 $mm^3$ to 1.9 $mm^3$. Each of the test samples was subjected to ignitability test. The ignitability test was conducted in the same manner as in Experiment 1, thereby determine the ignition probability of the test sample. The test results are indicated in FIG. 9. The test sample had an ignition probability of 100% or almost 100% when the volume of the ground electrode projection 35 was less than 1.5 $mm^3$. The ignition probability of the test sample decreased with increase in projection volume when the projection volume was 1.5 $mm^3$ or more. It has been thus shown that the plasma can be ejected from the spark plug 100 effectively to obtain sufficient ignitability by controlling the projection volume of the ground electrode 30 to less than 1.5 $mm^3$.

Experiment 5

Test samples (sample numbers 5-1 to 5-6) of the spark plugs 100 were produced with different dimensions. The dimensions of the test samples are indicated in TABLE. Each of the test samples was subjected to ignitability test. The ignitability test was conducted in the same manner as in Experiment 1 except that the air-fuel ratio of the air-$C_3H_8$ mixture was set to 23, i.e., higher than that of Experiment 4, thereby determining the ignition probability of the test sample under more severe conditions. The test results are indicated in TABLE. The test sample had an ignition probability of 100% even under severe conditions when the ground electrode projection 35 had a volume of less than 1.5 $mm^3$ and was kept from contact with the third imaginary circular conical surface. It has been thus shown that the spark plug 100 can be prevented from ignitability deterioration more assuredly by being kept from contact with the third imaginary circular conical surface.

TABLE

| Sample No. | R (mm) | D (mm) | T (mm) | Projection volume ($mm^3$) | Ignition probability (%) | Contact or non-contact with third imaginary circular conical surface |
|---|---|---|---|---|---|---|
| 5-1 | 0.5 | 1.0 | 0.5 | 0.004 | 100 | non-contact |
| 5-2 | 0.5 | 1.0 | 1.0 | 0.355 | 76 | contact |
| 5-3 | 1.0 | 1.5 | 0.5 | 0.006 | 100 | non-contact |
| 5-4 | 1.0 | 1.5 | 1.0 | 0.501 | 61 | contact |
| 5-5 | 1.5 | 2.0 | 0.5 | 0.008 | 100 | non-contact |
| 5-6 | 1.5 | 2.0 | 1.0 | 0.647 | 48 | contact |

In general, the ignitability of a spark plug to an air-fuel mixture largely decreases as the air-fuel ratio of the air-fuel mixture increases by 1 in a lean range (higher than the stoichiometric air-fuel ratio value). For example, in the case of an ordinary spark plug with a center electrode diameter of 2.5 mm and a discharge gap size of 0.8 mm, it is known that this ordinary spark plug is able to ignite an air-gasoline mixture of lean ratio but needs drastic design changes to decrease the center electrode diameter to 0.8 mm and increase the discharge gap size to 1.2 mm in order to maintain its ignitability when the air-gasoline ratio increases by one higher from the lean ratio value. However, the ignitability of the spark plug 100 can be maintained, without such drastic design changes, according to the first embodiment of the present invention.

Experiment 6

Figure 10:
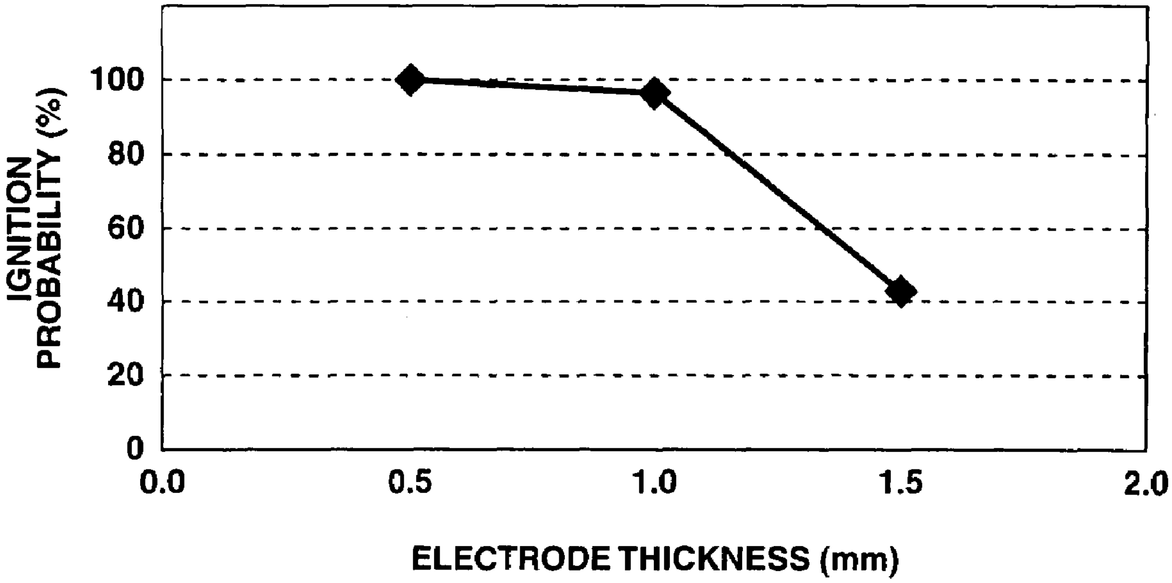

Three test samples of the spark plug 100 were produced with the following dimensions: D=1.0 mm, T=0.5 mm, 1.0 mm and 1.5 mm and R=0.5 mm. Each of the test samples was subjected to ignitability test. The ignitability test was conducted in the same manner as in Experiment 1, thereby determining the ignition probability of the test sample. The test results are indicated in FIG. 10. The test sample had an ignition probability of 100% when T=0.5 mm (D>T) and an ignition probability of nearly 100% when T=1.0 mm (D=T). However, the ignition probability of the test sample decreased significantly when T=1.5 mm (D<T). It has been thus shown that the spark plug 100 can be prevented from ignitability deterioration more assuredly by satisfying the dimensional relationship of $D \geqq T$.

As described above, it is possible in the first to fifth embodiments of the present invention to reduce the quenching effect of the ground electrode 30, 330, 350, 370, 390 on the plasma growth and prevent the ignitability of the spark plug 100, 320, 340, 360, 380 from deteriorating due to such an quenching effect by controlling the configuration of the opening 31, 331, 351-352, 371-372, 391 of the ground electrode 30, 330, 350, 370, 390 adequately.

The entire contents of Japanese Patent Application No. 2006-078710 (filed on Mar. 22, 2006) and No. 2007-052148 (filed on Mar. 2, 2007) are herein incorporated by reference.

Although the present invention has been described with reference to the above-specific embodiments of the invention, the invention is not limited to the these exemplary embodiments. Various modification and variation of the embodiments described above will occur to those skilled in the art in light of the above teaching.

For example, the discharge circuits 210 and 230 may be controlled directly by the ECU although the control circuits 220 and 240 are provided in the power supply unit 200 independently of and separately from the ECU in the above embodiments.

The power source and circuit configurations of the power supply unit 200 may be modified to allow a passage of electricity from the center electrode 20 to the ground electrode 30 (330, 350, 370, 390) e.g. by generating a positive-polarity voltage from the high-voltage generator 233 and by reversing the directions of the diodes 201 and 202. It is however desirable to design the power supply unit 200 in such a manner as to allow the passage of electricity from the ground electrode 30 (330, 350, 370, 390) to the center electrode 20 as in the above-mentioned embodiment, in view of the consumption of the center electrode 20, because the electrode tip 25 of the center electrode 20 is relatively small as compared to the ground electrode 30 (330, 350, 370, 390).

The front region 61 of the insulator through hole 12, which defines the cavity 60, is not necessarily made smaller in diameter than the electrode holding region 15 of the insulator through hole 12. The diameter R of the front hole region 61 may alternatively be made equal to or larger than that of the electrode holding region 15.

The ground electrode 30, 330, 350, 370, 390 is not necessarily held in contact with the ceramic insulator 10 although the ground electrode 30, 330, 350, 370, 390 is joined to the metal shell 50 with the rear end face of the ground electrode 30, 330, 350, 370, 390 held in contact with the front end face 16 of the ceramic insulator 10 in the above embodiments. The ground electrode 30, 330, 350, 370, 390 may not be held in contact with the ceramic insulator 10 as long as the quenching effect of the ground electrode 30, 330, 350, 370, 390 on the plasma can be limited effectively by controlling the configuration of the ground electrode opening 31, 331, 351-352, 371-372, 391 as specified above.

The scope of the invention is defined with reference to the following claims.

What is claimed is:

1. A plasma-jet spark plug, comprising:

a metal shell;

an electrical insulator retained in the metal shell and formed with an axial hole;

a center electrode held in the axial hole of the electrical insulator so as to define a discharge cavity by a front end face of the center electrode and an inner circumferential surface of the axial hole in a front end part of the electrical insulator; and a ground electrode formed in a plate shape, arranged on a front end of the electric insulator and connected electrically with the metal shell, the ground electrode having an opening defining portion defining therein an opening for communication between the discharge cavity and the outside of the spark plug;

said opening defining portion being located radially inside of or in contact with a first imaginary circular conical surface and including a section projecting radially inwardly from a second imaginary circular conical surface with the proviso that: the first imaginary circular conical surface has an axis coinciding with an axis of the spark plug and a vertex angle of 120° opening toward a front of the spark plug and passing through a front edge of the axial hole of the electrical insulator; and the second imaginary circular conical surface has an axis coinciding with the axis of the spark plug and a vertex angle of 60° opening toward the front of the spark plug and passing through the front edge of the axial hole of the electrical insulator; and said radially inwardly projecting section having a volume of 0 $mm^3$ to less than 1.5 $mm^3$.

2. A plasma-jet spark plug according to claim 1, wherein said opening defining portion is kept from contact with a third imaginary circular conical surface with the proviso that the third imaginary circular conical surface has an axis coinciding with the axis of the spark plug and a vertex angle of 30° opening toward the front of the spark plug and passing through the front edge of the axial hole of the electrical insulator.

3. A plasma-jet spark plug according to claim 1, wherein the ground electrode satisfies a dimensional relationship of $D \geqq T$ where D is a minimum diameter of the opening of the ground electrode; and T is an axial thickness of the ground electrode.

4. An ignition system, comprising:

a plasma-jet spark plug according to claim 1, further comprising a power source having capacity to supply 50 to 200 mJ of energy to the spark plug.

* * * * *